US010743262B2

(12) United States Patent
Visotsky et al.

(10) Patent No.: US 10,743,262 B2
(45) Date of Patent: Aug. 11, 2020

(54) BEAM MANAGEMENT FOR INTERFERENCE MITIGATION FOR WIRELESS NETWORKS

(71) Applicant: NOKIA SOLUTIONS AND NETWORKS OY, Espoo (FI)

(72) Inventors: Eugene Visotsky, Buffalo Grove, IL (US); Seungmo Kim, Blacksburg, VA (US); Ravindra Moorut, Tower Lakes, IL (US); Mark Cudak, Rolling Meadows, IL (US)

(73) Assignee: Nokia Solutions and Networks Oy, Espoo, FL (US)

(*) Notice: Subject to any disclaimer, the term of this patent is extended or adjusted under 35 U.S.C. 154(b) by 0 days.

(21) Appl. No.: 15/717,625

(22) Filed: Sep. 27, 2017

(65) Prior Publication Data

US 2018/0098289 A1 Apr. 5, 2018

Related U.S. Application Data

(60) Provisional application No. 62/402,690, filed on Sep. 30, 2016.

(51) Int. Cl.
*H04W 52/24* (2009.01)
*H04W 52/14* (2009.01)
*H04W 16/28* (2009.01)
*H04W 52/28* (2009.01)
*H04W 52/38* (2009.01)

(52) U.S. Cl.
CPC ......... *H04W 52/243* (2013.01); *H04W 16/28* (2013.01); *H04W 52/143* (2013.01); *H04W 52/283* (2013.01); *H04W 52/386* (2013.01)

(58) Field of Classification Search
CPC . H04W 52/243; H04W 16/28; H04W 52/143; H04W 52/283; H04W 52/386; H04W 88/08; H04W 88/085; H04W 24/02; H04W 84/045
USPC ........................................................ 455/501
See application file for complete search history.

(56) References Cited

U.S. PATENT DOCUMENTS

| 2010/0323711 | A1 | 12/2010 | Damnjanovic et al. |
| 2011/0319118 | A1 | 12/2011 | Yu et al. |
| 2013/0194950 | A1* | 8/2013 | Haghighat ............ H04W 24/02 370/252 |
| 2014/0185497 | A1* | 7/2014 | Wolf ..................... H04W 28/26 370/294 |

(Continued)

OTHER PUBLICATIONS

International Search Report and Written Opinion for International Application No. PCT/EP2017/074597, dated Nov. 6, 2017 (13 pages).

(Continued)

*Primary Examiner* — Ankur Jain
(74) *Attorney, Agent, or Firm* — Brake Hughes Bellermann LLP

(57) ABSTRACT

A technique of reducing interference at a wireless node includes: determining a location of a base station relative to a wireless node, determining, based at least on the location of the base station relative to the wireless node, a beam-reduction region that includes one or more interfering transmit beams of the base station within the beam-reduction region, and causing the base station to decrease a transmit power for the one or more interfering transmit beams within the beam-reduction region.

16 Claims, 11 Drawing Sheets

(56) References Cited

U.S. PATENT DOCUMENTS

| | | | |
|---|---|---|---|
| 2015/0016561 A1* | 1/2015 | Negus | H04W 24/02 |
| | | | 375/267 |
| 2016/0087336 A1* | 3/2016 | Maltsev | H04B 7/0695 |
| | | | 342/368 |
| 2017/0188379 A1* | 6/2017 | Shtrom | H04B 17/102 |

OTHER PUBLICATIONS

Final Acts of the World Radiocommunication Conference (WRC-15), Geneva, Switzerland 2015 (552 pages).
Mario Maniewicz, "Outcome of the World Radiocommunication Conference, 2015", DSA Global Summit; Apr. 26-28, 2016, Bogota, Colombia (22 pages).

* cited by examiner

BEAM MANAGEMENT FOR INTERFERENCE MITIGATION FOR WIRELESS NETWORKS

PRIORITY CLAIM

This Application claims the benefit of priority based on U.S. Provisional Application No. 62/402,690, filed Sep. 30, 2016, entitled, "Beam Management For Interference Mitigation For Wireless Networks," the disclosure of which is hereby incorporated by reference.

TECHNICAL FIELD

This description relates to communications, and in particular, to beam management for interference mitigation for wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, user devices or mobile stations are referred to as user equipments (UEs).

In some cases, interference between signals may occur at a wireless node, which may cause errors or a decrease performance of a receiver at the wireless node.

SUMMARY

According to an example implementation, a method includes determining a location of a base station relative to a wireless node; determining, based at least on the location of the base station relative to the wireless node, a beam-reduction region that includes one or more interfering transmit beams of the base station within the beam-reduction region; and, causing the base station to decrease a transmit power for the one or more interfering transmit beams within the beam-reduction region.

According to an example implementation, an apparatus includes at least one processor and at least one memory including computer instructions, when executed by the at least one processor, cause the apparatus to: determine a location of a base station relative to a wireless node; determine, based at least on the location of the base station relative to the wireless node, a beam-reduction region that includes one or more interfering transmit beams of the base station within the beam-reduction region; and, cause the base station to decrease a transmit power for the one or more interfering transmit beams within the beam-reduction region.

According to an example implementation, an apparatus includes means for determining a location of a base station relative to a wireless node; means for determining, based at least on the location of the base station relative to the wireless node, a beam-reduction region that includes one or more interfering transmit beams of the base station within the beam-reduction region; and, means for causing the base station to decrease a transmit power for the one or more interfering transmit beams within the beam-reduction region.

According to an example implementation, a computer program product includes a computer-readable storage medium and storing executable code that, when executed by at least one data processing apparatus, is configured to cause the at least one data processing apparatus to perform a method including: determining a location of a base station relative to a wireless node; determining, based at least on the location of the base station relative to the wireless node, a beam-reduction region that includes one or more interfering transmit beams of the base station within the beam-reduction region; and, causing the base station to decrease a transmit power for the one or more interfering transmit beams within the beam-reduction region.

According to an example implementation, a method includes receiving, for each of a plurality of beams transmitted by a base station, a beam identification and a signal measurement, measured by a probe user device in close proximity to or co-located with a wireless node, for the beam; determining that one or more of the beams are interfering beams having a signal measurement greater than a threshold; and causing the base station to decrease a transmit power for the one or more interfering transmit beams so as to reduce interference at the wireless node from the base station.

According to an example implementation, an apparatus includes at least one processor and at least one memory including computer instructions, when executed by the at least one processor, cause the apparatus to: receive, for each of a plurality of beams transmitted by a base station, a beam identification and a signal measurement, measured by a probe user device in close proximity to or co-located with a wireless node, for the beam; determine that one or more of the beams are interfering beams having a signal measurement greater than a threshold; and cause the base station to decrease a transmit power for the one or more interfering transmit beams so as to reduce interference at the wireless node from the base station.

According to an example implementation, an apparatus includes means for receiving, for each of a plurality of beams transmitted by a base station, a beam identification and a signal measurement, measured by a probe user device in close proximity to or co-located with a wireless node, for the beam; means for determining that one or more of the beams are interfering beams having a signal measurement greater than a threshold; and means for causing the base station to decrease a transmit power for the one or more interfering transmit beams so as to reduce interference at the wireless node from the base station.

According to an example implementation, a computer program product includes a computer-readable storage medium and storing executable code that, when executed by at least one data processing apparatus, is configured to cause the at least one data processing apparatus to perform a method including: receiving, for each of a plurality of beams transmitted by a base station, a beam identification and a signal measurement, measured by a probe user device in close proximity to or co-located with a wireless node, for the beam; determining that one or more of the beams are interfering beams having a signal measurement greater than a threshold; and causing the base station to decrease a transmit power for the one or more interfering transmit beams so as to reduce interference at the wireless node from the base station.

The details of one or more examples of implementations are set forth in the accompanying drawings and the description below. Other features will be apparent from the description and drawings, and from the claims.

DETAILED DESCRIPTION

Figure 1:
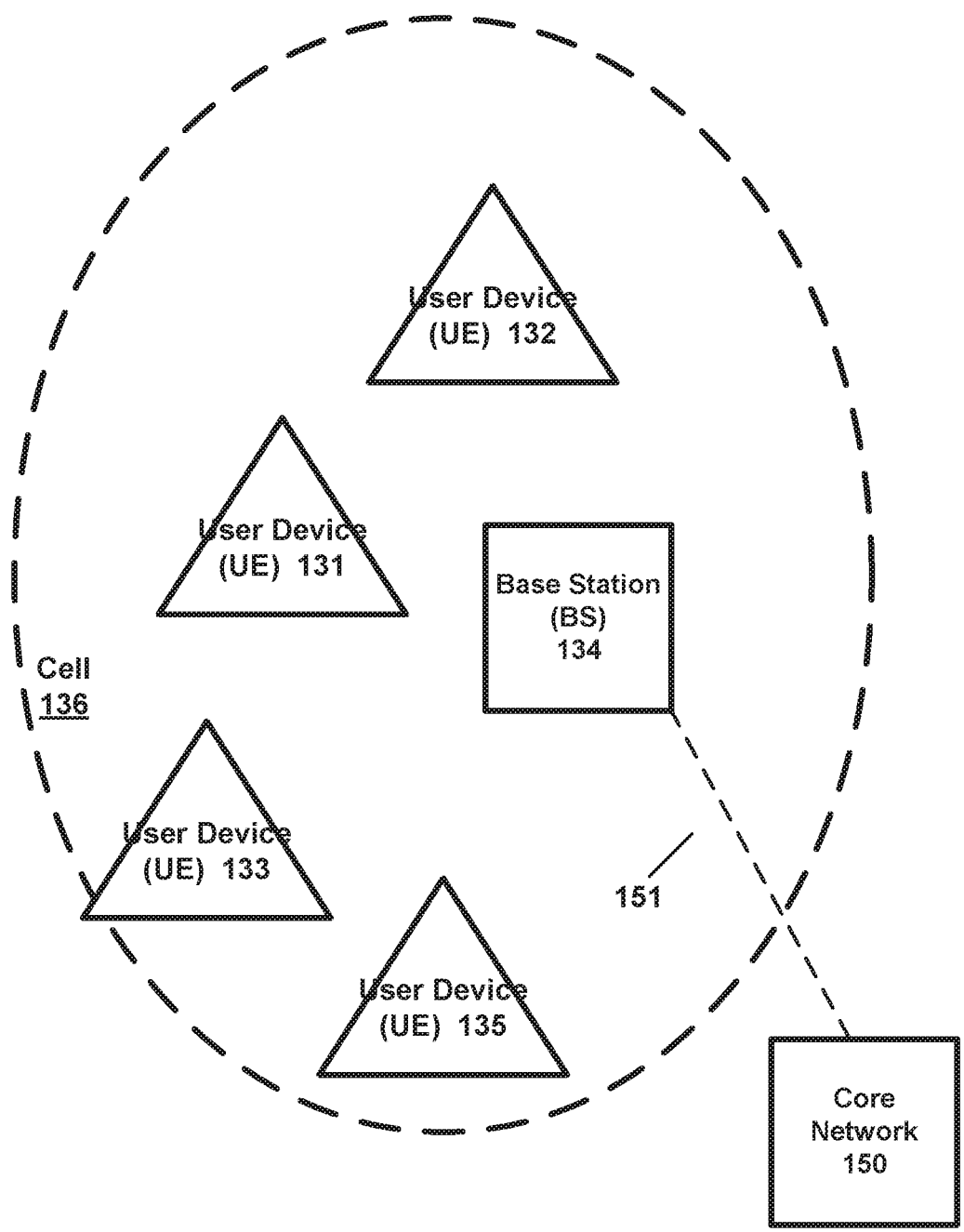
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

By way of illustrative example, the various example implementations or techniques described herein may be applied to various user devices, such as machine type communication (MTC) user devices, enhanced machine type communication (eMTC) user devices, Internet of Things (IoT) user devices, and/or narrowband IoT user devices. IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Also, in an example implementation, a user device or UE may be a UE/user device with ultra reliable low latency communications (URLLC) applications. A cell (or cells) may include a number of user devices connected to the cell, including user devices of different types or different categories, e.g., including the categories of MTC, NB-IoT, URLLC, or other UE category.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, IoT, MTC, eMTC, URLLC, etc., or any other wireless network or wireless technology. These example networks or technologies are provided only as illustrative examples, and the various example implementations may be applied to any wireless technology/wireless network.

The 5th Generation (5G) of wireless networks provides expansion of International Mobile Telecommunications (IMT) that go beyond those of IMT-2000 and IMT-Advanced mobile broadband (MBB) service, and also envisioning to address new services and use cases.

Figure 2:
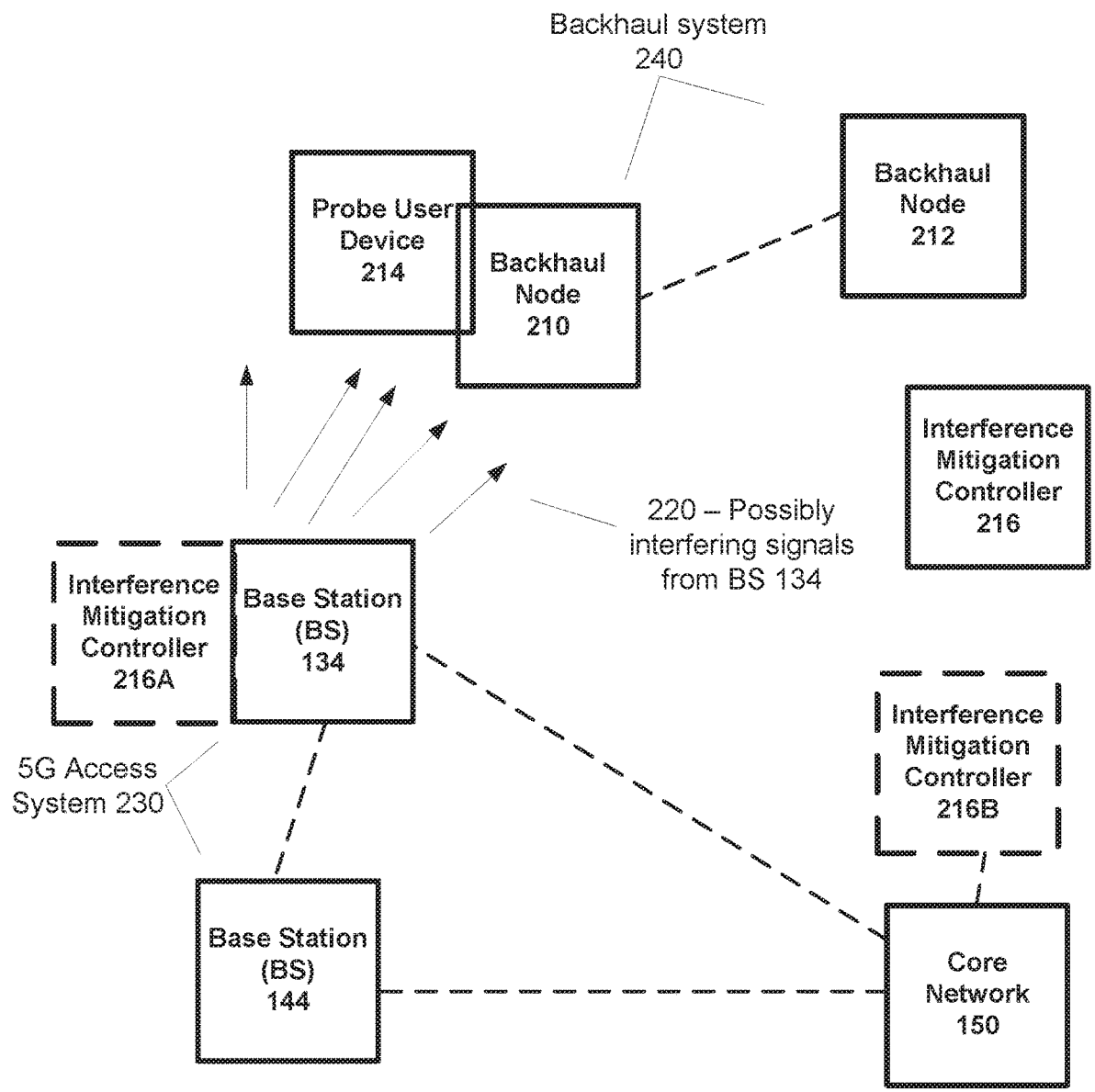
FIG. 2 is a diagram of a wireless network that illustrates a co-existence between a 5G (or other) access system 230 and a backhaul system 240.

FIG. 2 is a diagram of a wireless network that illustrates a co-existence between a 5G (or other) access system 230 and a backhaul system 240. 5G access system (for example) may include one or more base stations (BSs), such as BS 134 and BS 144. BSs 134 and 144 may be connected to each other via a BS-to-BS connection or interface, and each BS may be connected to core network 150.

In addition, there may be one or more additional wireless nodes that may not be part of the 5G access system, such as one or more backhaul nodes that may be part of a backhaul system 240 that may operate to transmit data or signals via wireless spectrum to another wireless node or between backhaul nodes. Thus, an example backhaul system 240 may include backhaul node 210 and backhaul node 212, as illustrative examples. Backhaul nodes 210 and 212 may be examples of wireless nodes that are not part of 5G access system 230.

According to an example implementation, the backhaul system 240 (e.g., including backhaul nodes 210, 212) may share spectrum with 5G access system 230 (e.g., including BSs 134, 144). According to an example implementation, the backhaul system, 240 including one or more backhaul nodes (e.g., mmWave backhaul nodes) may share a wireless spectrum, such as a mmWave spectrum or bandwidth or other wireless spectrum, with the 5G access system 230. An illustrative example of a bandwidth or wireless spectrum that may be shared by both a 5G access system 230 and a backhaul system 240 (including one or more backhaul nodes) may include, for example, a 70 GHz band, e.g., 71-76 GHz. This is merely an illustrative example, and other wireless bands or spectrum may be shared between a mobile access system (e.g., 5G access system 230) (e.g., which may include 5G or 4G base stations) and a backhaul system 240 (or other wireless system) that may include one or more backhaul nodes or other wireless nodes.

According to an example implementation, both backhaul system 240 and access system 230 may employ beamforming, e.g., in which one of a plurality of directional beams may be used to transmit signals (e.g., via a transmit beam) and/or receive signals (e.g., via a receive beam). By using a beam that may be provided in a specific direction, a signal gain may be increased in that direction, depending on a beam width. For example, one of a plurality of beams (each beam covering a different area or region) may be selected based on a set of weights that are applied to an antenna or steerable antenna system/array.

A problem that may arise is that, at least in some cases, signals transmitted from the 5G access system 230 may interfere with the operation of the backhaul system 240. In an example implementation, due to the shared spectrum between access system 230 and backhaul system 240, a major source of interference for backhaul nodes 210 and 212 may be, for example, downlink transmissions from BSs 134 and 144 of 5G access system 230. The downlink transmissions from BSs 134 and/or 144 may be directed to user devices or UEs (not shown), but may inadvertently be received by one or more backhaul nodes of backhaul system 240, for example. For example, the downlink transmissions from BS 134 may include one more possibly interfering signals 220, which may be received by and/or interfere with other signals received by the backhaul node 210, by way of example. As a result of such interference, the receiver operation of backhaul node 210 may be negatively impacted, e.g., decreasing a signal-to-interference plus noise ratio (SINR), causing errors in received and/or decoded signals, and/or decreasing the performance of the wireless receiver of a backhaul node (which may include a wireless transmitter and receiver). As a result, it may be advantageous to mitigate or decrease the interference received by backhaul system 240 from access system 230.

According to an example implementation, an interference mitigation (IM) controller 216 may be provided to make calculations or determinations (e.g., determine locations of nodes, distances between a BS and a backhaul node, determine antenna orientations for a BS and a backhaul node, determine beam-reduction regions, etc.), receive signal measurements, and/or cause one or more BSs of access system 230 to reduce the transmission power of one or more interfering beams. IM controller 216 may be a centralized entity, e.g., which may be provided in or as part of core network 150 (e.g., interference mitigation controller 216B) or in a cloud or network, or as a distributed interference mitigation controller (e.g., as interference mitigation controller 216A, which may be provided as part of or co-located with a BS or each of multiple BSs of access system 230, for example). IM controller 216 may refer to any interference mitigation system or controller, regardless of its location, and may include either a centralized IM controller (such as IM controller 216B, that may mitigate interference for multiple BSs) or a distributed IM controller (such as IM controller 216A), by way of illustrative example. For example, IM controller 216 may be a software application or logic provided on or running on a B S (or provided on one or more BSs), a core network device, or other computing device.

Example 1

Figure 3:
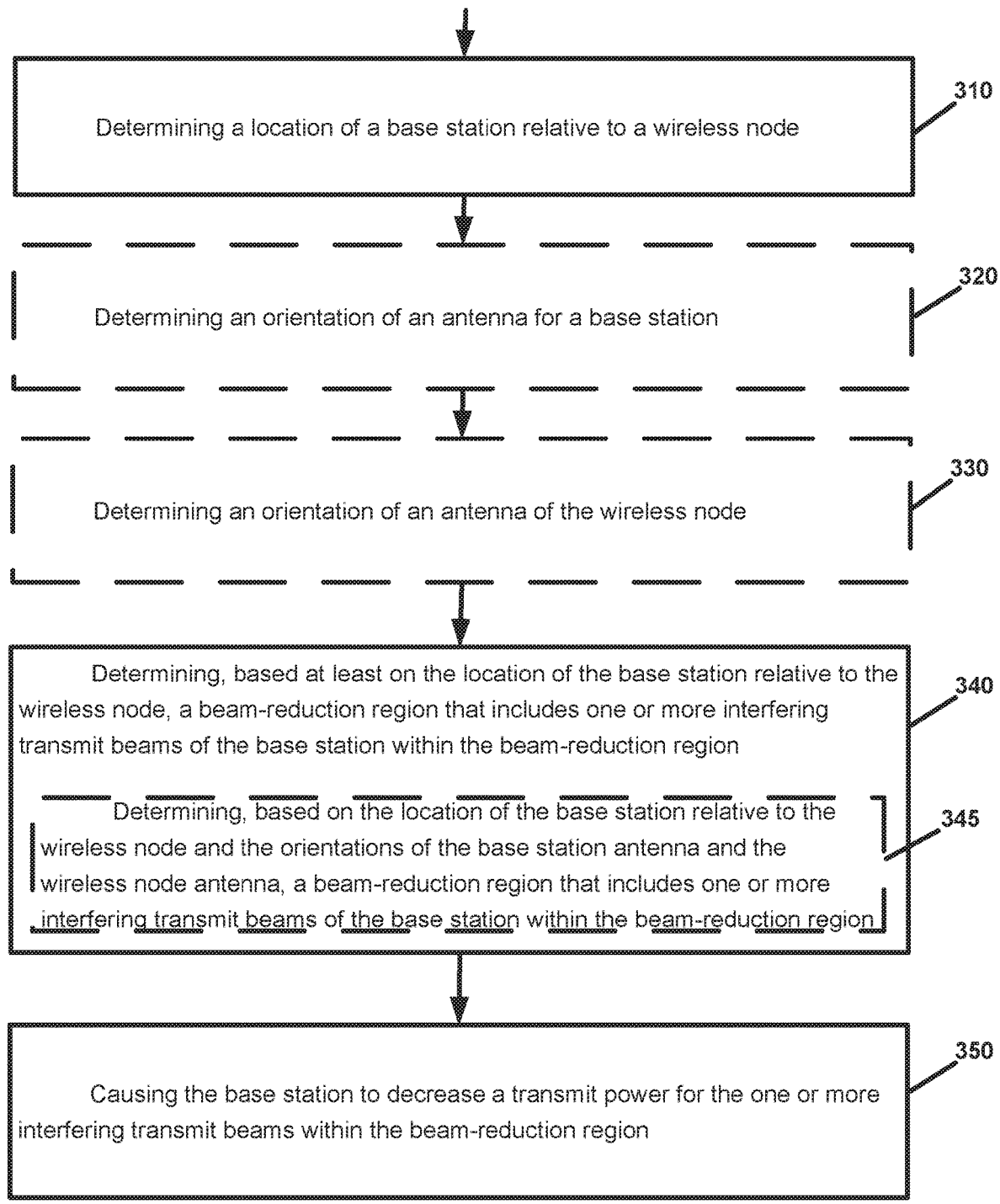
FIG. 3 is a flow chart illustrating operation of an interference mitigation controller, a base station or other device according to an example implementation.

FIG. 3 is a flow chart illustrating operation of an interference mitigation controller, a base station or other device according to an example implementation. The method of FIG. 3 may be directed to reducing interference at a wireless node. Operation 310 includes determining a location of a base station relative to a wireless node. Operation 340 includes determining, based at least on the location of the base station relative to the wireless node, a beam-reduction region that includes one or more interfering transmit beams of the base station within the beam-reduction region. And, operation 350 includes causing the base station to decrease a transmit power for the one or more interfering transmit beams within the beam-reduction region.

Example 2

According to the method of example 1, and further comprising: determining (operation 320) an orientation of an antenna for a base station; and determining (operation 330) an orientation of an antenna of the wireless node; and wherein the determining (operation 340) a beam-reduction region comprises: determining (operation 345), based on the location of the base station relative to the wireless node and the orientations of the base station antenna and the wireless node antenna, a beam-reduction region that includes one or more interfering transmit beams of the base station within the beam-reduction region.

Example 3

According to the method of any of examples 1-2, wherein the wireless node comprises a backhaul node, and wherein causing the base station to decrease a transmit power for the one or more interfering transmit beams reduces, at the backhaul node, interference between a signal transmitted by the base station and another signal received by the backhaul node.

Example 4

According to the method of any of examples 1-3, wherein the base station comprises a 5G base station or access point.

Example 5

According to the method of any of examples 1-4, wherein the causing the base station to decrease a transmit power for the one or more interfering transmit beams comprises: causing the base station to decrease a transmit power for each of one or more transmit beams for each of a plurality of BSs, wherein an amount of decrease in transmit power for each transmit beam is based on the location of the base station relative to the wireless node and the orientations of the base station antenna and the wireless node antenna.

Example 6

According to the method of any of examples 1-5, wherein the causing the base station to decrease a transmit power for the one or more interfering transmit beams comprises: causing the base station to turn off the one or more interfering transmit beams, including either ceasing to transmit a signal via the one or more interfering beams, or transmitting a signal at zero power via the one or more transmit beams.

Example 7

According to the method of any of examples 1-6, wherein the determining an orientation of an antenna for the base station comprises: determining an orientation of an antenna for a base station, including an azimuth angle and an elevation angle of the antenna for the base station.

Example 8

According to the method of any of examples 1-7, wherein the determining an orientation of an antenna for the wireless node comprises: determining an orientation of an antenna of a wireless node, including an elevation angle and an azimuth angle of the antenna of the wireless node.

Example 9

According to the method of any of examples 1-8, wherein the determining a beam-reduction region comprises determining a beam-reduction region as an overlap of the following two regions: a first region in which a transmit beam transmitted by the base station within this first region would create interference at the wireless node; and a steerable region for base station transmit beams within one or more sectors of the base station.

Example 10

According to the method of any of examples 1-9, wherein the determining a beam-reduction region comprises determining a beam-reduction region as an overlap of the following two regions: an off-axis region within a range of an axis between the base station and the wireless node in which a transmit beam transmitted by the base station within this off-axis region would create interference at the wireless node; and a steering region of a sector of the base station that defines a steerable region of a plurality of transmit beams of a sector of the base station.

Example 11

According to the method of any of examples 1-10, wherein the determining a beam-reduction region comprises: determining a beam-reduction region as an overlap of the following two regions: an off-axis region between a) a line identifying an axis between the base station and the wireless node and b) a maximum off-axis angle based on a receive beam width of the wireless node; and a steering region of a sector of the base station, including a region between the antenna orientation for a sector of the base station and a maximum steerable range of the antenna for the sector.

Example 12

According to the method of any of examples 1-11, and further comprising: receiving, from a probe user device located in close proximity or co-located with the wireless node, signal measurements for one or more of the interfering beams within the beam-reduction zone; and wherein the causing comprises causing, based on the signal measurements for one or more of the interfering beams, the base station to decrease a transmit power for the one or more interfering transmit beams within the beam-reduction zone.

Example 13

According to the method of any of examples 1-12, wherein the determining a location of a base station relative to a wireless node comprises at least one of the following: determining, based on a table lookup, a location of the base station relative to the wireless node; receiving, from a probe user device located in close proximity or co-located with the wireless node, information indicating a location of a base station relative to a wireless node; and receiving, from a probe user device located in close proximity or co-located with the wireless node, signal measurements for one or more of the interfering beams within the beam-reduction zone.

Example 14

An apparatus comprising means for performing a method of any of examples 1-13.

Example 15

An apparatus comprising at least one processor and at least one memory including computer instructions, when executed by the at least one processor, cause the apparatus to perform the method of any of examples 1-13.

Example 16

A computer program product, the computer program product comprising a computer-readable storage medium and storing executable code that, when executed by at least one data processing apparatus, is configured to cause the at least one data processing apparatus to perform the method of any of examples 1-13.

Example 17

An apparatus comprising at least one processor and at least one memory including computer instructions, when executed by the at least one processor, cause the apparatus to: determine a location of a base station relative to a wireless node; determine, based at least on the location of the base station relative to the wireless node, a beam-reduction region that includes one or more interfering transmit beams of the base station within the beam-reduction region; and cause the base station to decrease a transmit power for the one or more interfering transmit beams within the beam-reduction region.

Example 18

Figure 4:
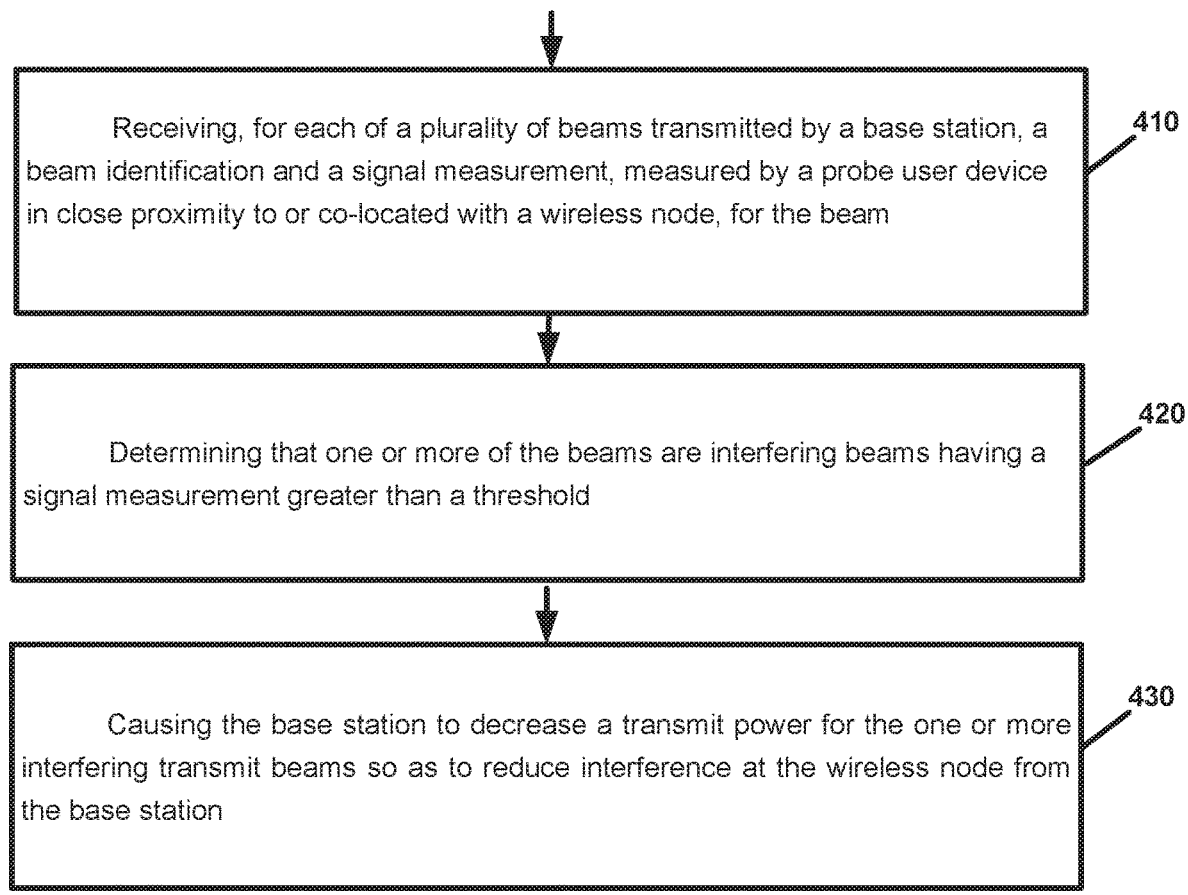
FIG. 4 is a flow chart illustrating operation of an interference mitigation controller, a base station or other device according to another example implementation.

FIG. 4 is a flow chart illustrating operation of an interference mitigation controller, a base station or other device according to another example implementation. The method of FIG. 4 may be directed to reduce interference at a wireless node. Operation 410 includes receiving, for each of a plurality of beams transmitted by a base station, a beam identification and a signal measurement, measured by a probe user device in close proximity to or co-located with a wireless node, for the beam. Operation 420 includes determining that one or more of the beams are interfering beams having a signal measurement greater than a threshold. And, operation 430 includes causing the base station to decrease a transmit power for the one or more interfering transmit beams so as to reduce interference at the wireless node from the base station.

Example 19

According to the method of example 18, wherein one or more antenna characteristics of the probe user device match one or more antenna characteristics of the wireless node.

Example 20

According to the method of any of examples 18-19, wherein the probe user device and the wireless node are connected to the same antenna.

Example 21

According to the method of any of examples 18-20, wherein the causing comprises: performing, by the base station, a beam-specific power control for one or more of the beams to reduce a signal measurement of one or more of the beams of the base station, as measured by the probe user device, to be less than a threshold.

Example 22

According to the method of any of examples 18-21, wherein the wireless node comprises a backhaul node, and wherein causing the base station to decrease a transmit power for the one or more interfering transmit beams reduces, at the backhaul node, interference between a signal transmitted by the base station and another signal received by the backhaul node.

Example 23

According to the method of any of examples 18-22, wherein the base station comprises a 5G base station or access point.

Example 24

According to the method of any of examples 18-23, wherein the causing the base station to decrease a transmit power for the one or more interfering transmit beams comprises: causing the base station to turn off the one or more interfering transmit beams, including either ceasing to transmit a signal via the one or more interfering beams, or transmitting a signal at zero power via the one or more transmit beams.

Example 25

An apparatus comprising at least one processor and at least one memory including computer instructions, when executed by the at least one processor, cause the apparatus to: receive, for each of a plurality of beams transmitted by a base station, a beam identification and a signal measurement, measured by a probe user device in close proximity to or co-located with a wireless node, for the beam; determine that one or more of the beams are interfering beams having a signal measurement greater than a threshold; and cause the base station to decrease a transmit power for the one or more interfering transmit beams so as to reduce interference at the wireless node from the base station.

Example 26

A computer program product, the computer program product comprising a computer-readable storage medium and storing executable code that, when executed by at least one data processing apparatus, is configured to cause the at least one data processing apparatus to perform a method of any of examples 18-24.

Example 27

An apparatus comprising at least one processor and at least one memory including computer instructions, when executed by the at least one processor, cause the apparatus to perform the method of examples 18-24.

Example 28

An apparatus comprising means for performing a method of any of examples 18-24.

According to an example implementation, a computer program product includes a computer-readable storage medium and storing executable code that, when executed by at least one data processing apparatus, is configured to cause the at least one data processing apparatus to perform a method of FIG. 3 or of the method of FIG. 4.

Further example implementations will now be described.

Figure 5:
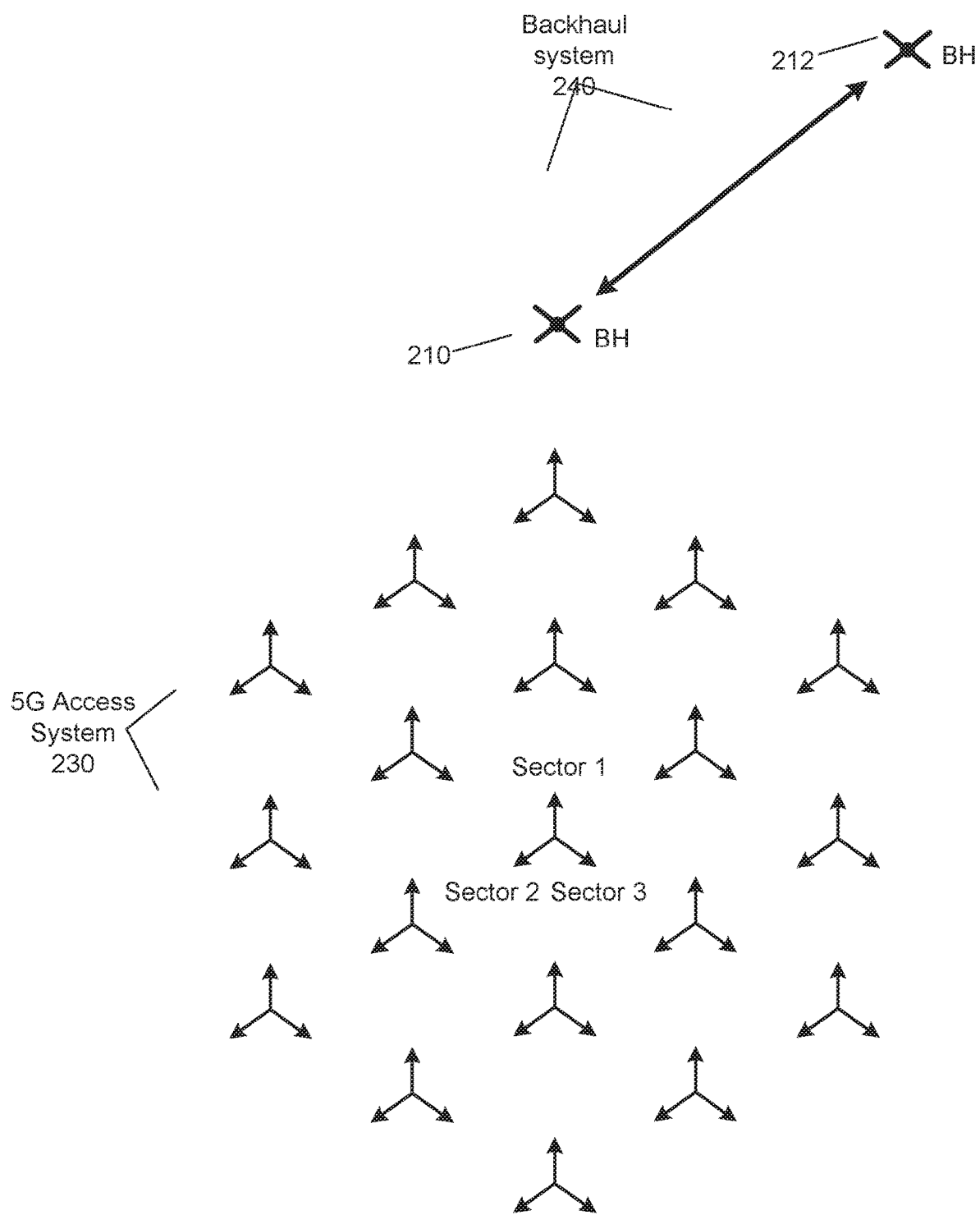
FIG. 5 is a diagram illustrative an example topology of coexistence between a 5G access system and a backhaul system.

FIG. 5 is a diagram illustrative an example topology of coexistence between a 5G access system and a backhaul system. As shown in the topology example illustrated in FIG. 5, a 5G access system 230 may include a plurality of BSs, with each BS (or cell) including a plurality (e.g., 3) sectors, with the BS including an antenna for each sector. Three arrows are shown for each BS, where each of the three arrows of a BS identifies an orientation of a sector antenna for the BS. A backhaul system 240 may include a plurality of backhaul nodes including backhaul (BH) nodes 210 and 212, for example. The backhaul nodes 210 and 212 may communicate or transmit information between each other via wireless resources or wireless spectrum that may also be used (shared) by the 5G access system 230. Thus, a problem arises as to provide for the coexistence of a 5G access system 230 and an incumbent (e.g., mmWave) backhaul system 240 that both use a shared wireless spectrum, e.g., a spectrum in the 70 GHz Band (71-76 GHz), or other wireless spectrum.

FIG. 5 illustrates a coexistence scenario between 5G access system 230 and a backhaul system 240. In this illustrative example scenario, there are 19 sites or BSs (access points or eNBs) in the 5G access system, each of which includes three sectors. Thus, this example access system consists of 57 sectors in total. A location of a backhaul node may be specified in terms of a distance and angle relative to the center of the 5G access system, or in terms of a distance and angle relative to a particular BS of the 5G access system 230 (e.g., the distance between the backhaul node and the BS, and an angle therebetween measured, e.g., with the angle measured from a reference point).

According to an example implementation, a backhaul node may be fixed at a designated location, and its location might be a-priori listed in a database (e.g., which may be accessed by a BS or IM controller to determine a backhaul node location), as usage of the band may typically be licensed by the FCC (Federal Communications Commission), according to an example implementation. Also, the backhaul system 240 is a point-to-point (P2P) wireless system; hence the antenna beam pattern that it uses (or that is used by the antenna of the BS or used by an antenna of each sector) may be very narrow, e.g., the 3-dB beamwidth may be, for example, <0.2 degree. For an interference scenario between the backhaul node and a BS, it may be assumed that the backhaul node is receiving a transmission from another backhaul node and is affected by the interference due to DL (downlink) BS-to-user device transmissions of the 5G access system 230. According to an example implementation, an interference requirement may be defined by the ITU and the FCC as follows. The ITU may define, for example, that as a primary-to-primary coexistence, −10 dB of I/N (interference to noise ratio) must or should be achieved, whereas the FCC defines that the interference must be at least 1 dB lower than a pre-specified static threshold. Thus, a threshold may be defined, such that the interference at a backhaul node within backhaul system 240 should be less than the threshold.

According to an example implementation, it may be expected that the dominant component of the 5G interference into backhaul node receivers may be the DL BS-to-user device transmissions in the 5G downlink. The reason is that the transmission power and antenna gain of a 5G BS is typically significantly greater than that of a user device (e.g., 5G user device). Based on simulations, without proper 5G interference management, the interference from a 5G BS into a backhaul node receiver(s) may be significant even with backhaul-5G access separation distances of several kilometers. Therefore, an interference mitigation technique may be useful to reduce interference when establishing a 5G access system in the vicinity of a backhaul system (or other wireless system).

Various example implementations are described for, e.g., mitigating the interference from 5G BSs into backhaul node (or other wireless node) receivers.

According to an example implementation, an interference mitigation method may include a three-step process:

1) Obtain the locations of nearby backhaul node locations in a "probe-based" manner (e.g., user device probe, located in close proximity to (or co-located with) the backhaul node, measures RSRP of signals received from the BSs as received by a user device (UE) probe), or through a database lookup.

2) Define or determine (an) a beam-reduction region(s) (or which may also be described as an exclusion zone(s)) at each BS. A beam-reduction zone may be defined on a per-beam basis.

3) Beam-specific power control may then be applied at each BS, e.g., for all or one or more interfering beams within the beam-reduction region, to reduce the transmission power and/or turn off (e.g., cease transmitting the interfering beam) to reduce transmission in the beam-reduction region (and/or from one or more interfering beams), and thereby reduce interference at the backhaul node. And, in a case where transmission of a group of interfering beams within the beam-reduction region are turned off (cease transmission of the interfering beams within the beam-reduction region), the system (or a BS) may possibly handover one or more user devices in such (turned off) beam-reduction region to an alternative sector or to cause the user device to switch to a non-interfering beam, e.g., based on reference signal received power (RSRP) measurements of the user device. In an example implementation, by applying the three steps above, the interference from 5G BSs to a backhaul system may be suppressed, without significantly impacting the downlink performance of the 5G access system.

Several different implementations or techniques are describes for reducing interference at a backhaul node from one or more BSs, including at least a calculation-based technique and a probe-based technique. Other techniques or approaches may also be used to reduce interference at the backhaul node.

These three steps, noted above, may be implemented using the calculation-based technique. With respect to an example calculation-based technique, the first step may be for the BS or IM controller to obtain the locations of nearby backhaul nodes. In an example implementation, the location of the backhaul node may be determined, e.g., including a relative distance and angle with respect to a BS, e.g., via database lookup. In addition, the BS or IM controller may also determine an orientation of an antenna (e.g., direction the antenna is pointing) of the backhaul node, e.g., via database lookup or other technique. The BS may also determine its own antenna orientation, e.g., for each of the sector antennas of the BS. According to an example implementation of the second step according to a calculation-based technique, the BS or IM controller may determine, based on the location of the BS relative to the backhaul node and the orientations of the BS antenna and backhaul node antenna, a beam-reduction region that includes one or more interfering transmit beams of the BS within the beam reduction region.

As noted, the second step may include determining or defining beam-reduction regions (which may also be referred to as beam exclusion zones). It is assumed that all 5G APs are sectorized with three sectors per site. A beam-reduction region at a BS, may be defined by taking into consideration (i) a 5G BS's location relative to the backhaul node receiver, (ii) the orientation of a sector antenna for the BS, (iii) the direction or orientation of each sector's beam (for each of the possible BS transmit beams), (iv) the direction or orientation of the backhaul node receive beam (or the orientation of the backhaul node antenna). In this example it is assumed that the BN location is known by the 5G system.

As an example of the third step for the calculation based-technique, the IM controller or the BS may cause the BS to decrease a transmit power of the one or more interfering beams transmitted by the BS within the beam-reduction region. Thus, for example, all BS transmit beams within the beam-reduction region may be reduced (or even turned off), either by a fixed amount for all, or by a variable amount depending on the relative distance and the antenna orientations for the BS and backhaul node antennas. Or, for example, selected BS transmit beams may be reduced (or even turned off), e.g., based on additional information or feedback (e.g., such as RSRP measurements for each BS transmit beam, which may be provided by a probe user device, thus combining aspects of both the calculation-based technique and the probe-based technique).

As an alternative to a calculation-based technique to reduce interference, a probe-based technique may be used where, e.g., a 5G probe user device may be deployed at or near a backhaul node. For example, the probe user device may be in proximity or near the backhaul node, or may be co-located with the backhaul node. The prober user device may have an antenna with one or more antenna characteristics that match one or more antenna characteristics of the backhaul node antenna. Or the probe user device may even use or share or be connected to the same antenna as the backhaul node (which would mean, for example, that the antenna characteristics of the probe would be the same as antenna characteristics of the backhaul node). By having the probe user device very close to (e.g., in proximity to or co-located with) the backhaul node and by having the probe user device have one or more antenna characteristic that match (or are very similar to) the backhaul node antenna characteristics, this may ensure or make it more likely that the probe user device will accurately detect and measure RSRP (reference signal received power) or other signal measurement of signals of the various BS transmit beams that will be the same or very similar to the signal measurements (e.g., RSRP) received by the backhaul node. In an example implementation, the 5G user device probe scans for the 5G beam transmissions from a BS(s), and then measures and reports the beam's RSRP measurements back to the 5G system (e.g., back to the IM controller 216 or other device, core network, network controller, . . . ). In the interference reports, interfering 5G BSs and beams are identified along with their corresponding signal strength (e.g., RSRP) measurements. The 5G probe user device may operate as, or similar to, a 5G user device and may rely on the 5G air-interface beam measurement procedures to identify the offending 5G BSs along with the dominant beams (e.g., those beams having RSRP greater than a threshold value) causing interference at the backhaul node. Note that the probe orientation and antenna characteristics should roughly match those of the backhaul node. In this manner, a beam-reduction region may be determined based on the beam interference reports received from the 5G probe user devices that are co-located or in proximity with the backhaul nodes. For example, the interference reports can be delivered to the 5G system over a wired backhaul connection or over an out-of-band wireless link. Based upon this information, the 5G system can take proactive steps in order to reduce interference at the backhaul nodes.

The third step may include reducing the transmission power or even turning off or shutting down for BS sector beams that are in the beam-reduction region or that are identified as high interference beams in the 5G probe reports. DL pilot transmissions corresponding to these beams may also be shut-down or power reduced in the 5G beam scanning intervals. This enables 5G user devices to detect reduced power levels associated with these beams during their beam or cell re-selection or initial attachment process, which may cause the user device to select a BS transmit beam that has not been reduced or turned off, for example.

Figure 6:
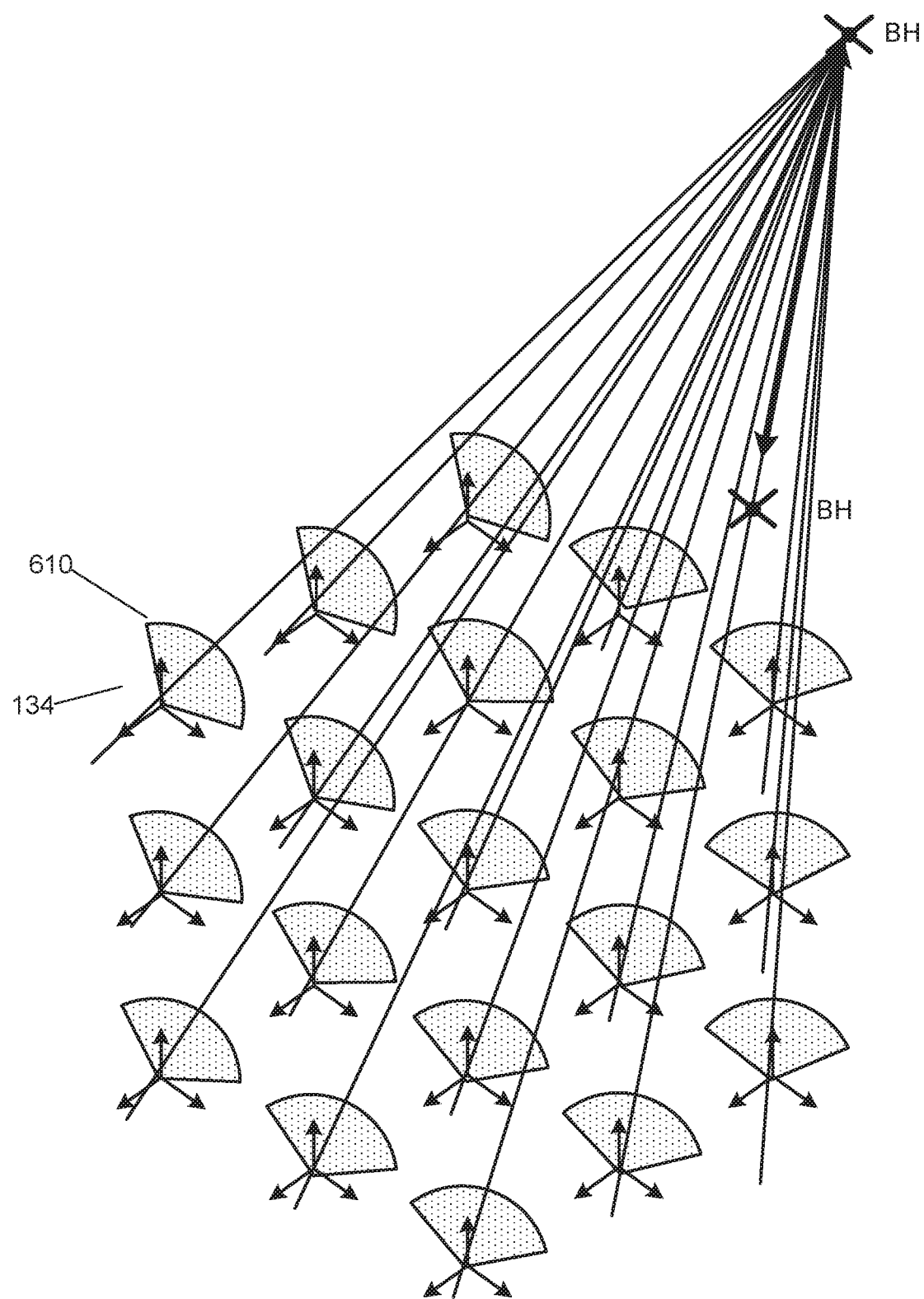
FIG. 6 is a diagram illustrating beam-reduction regions for each of multiple BSs of an access system.

FIG. 6 is a diagram illustrating beam-reduction regions for each of multiple BSs of an access system. For example, a beam-reduction region 610 is shown for a BS 134.

Figure 7:
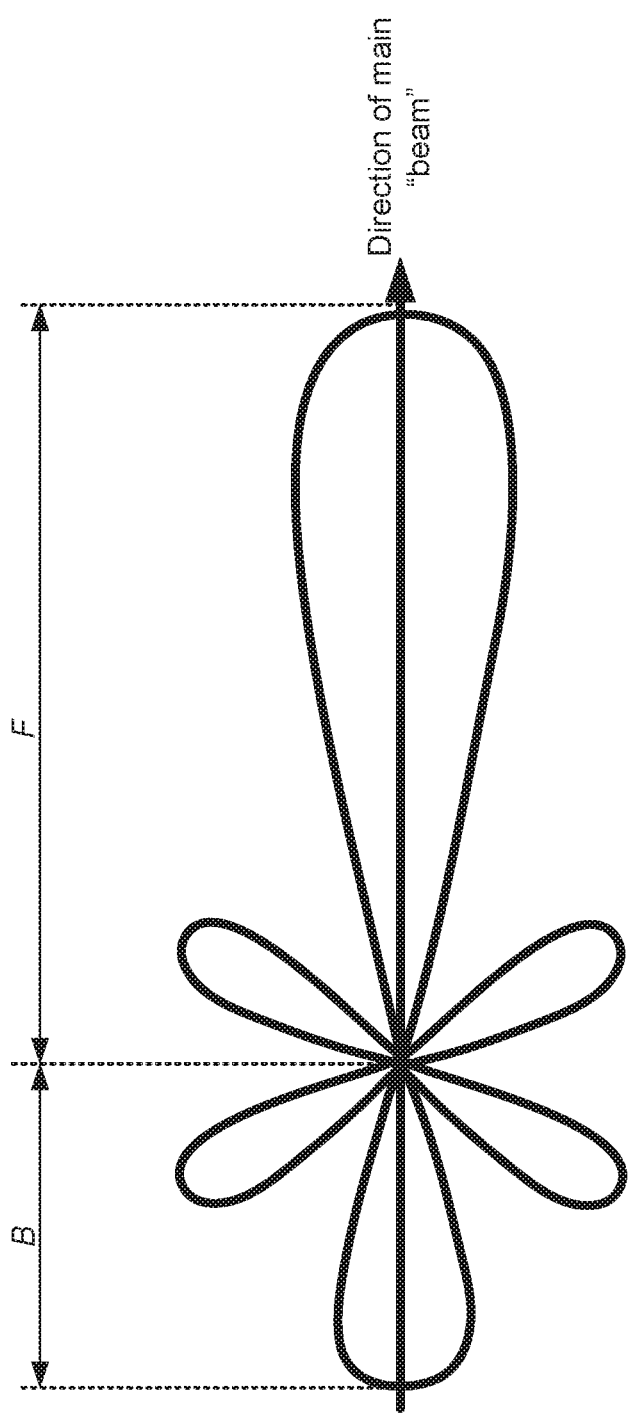
FIG. 7 illustrates an example of a 5G BS antenna beam pattern, which has a high front-to-back ratio.

For example, decreasing transmission power or shutting down interfering beams or beams in the beam-reduction region may be based on the fact that a 5G BS may likely use a directional high-gain antenna array that has a high value of front-to-back (F/B) ratio, and thus shutting down or powering down beams that are aligned with the backhaul node receive beam will significantly reduce interference observed at the backhaul node. FIG. 7 illustrates an example of a 5G BS antenna beam pattern, which has a high front-to-back ratio.

Figure 8:
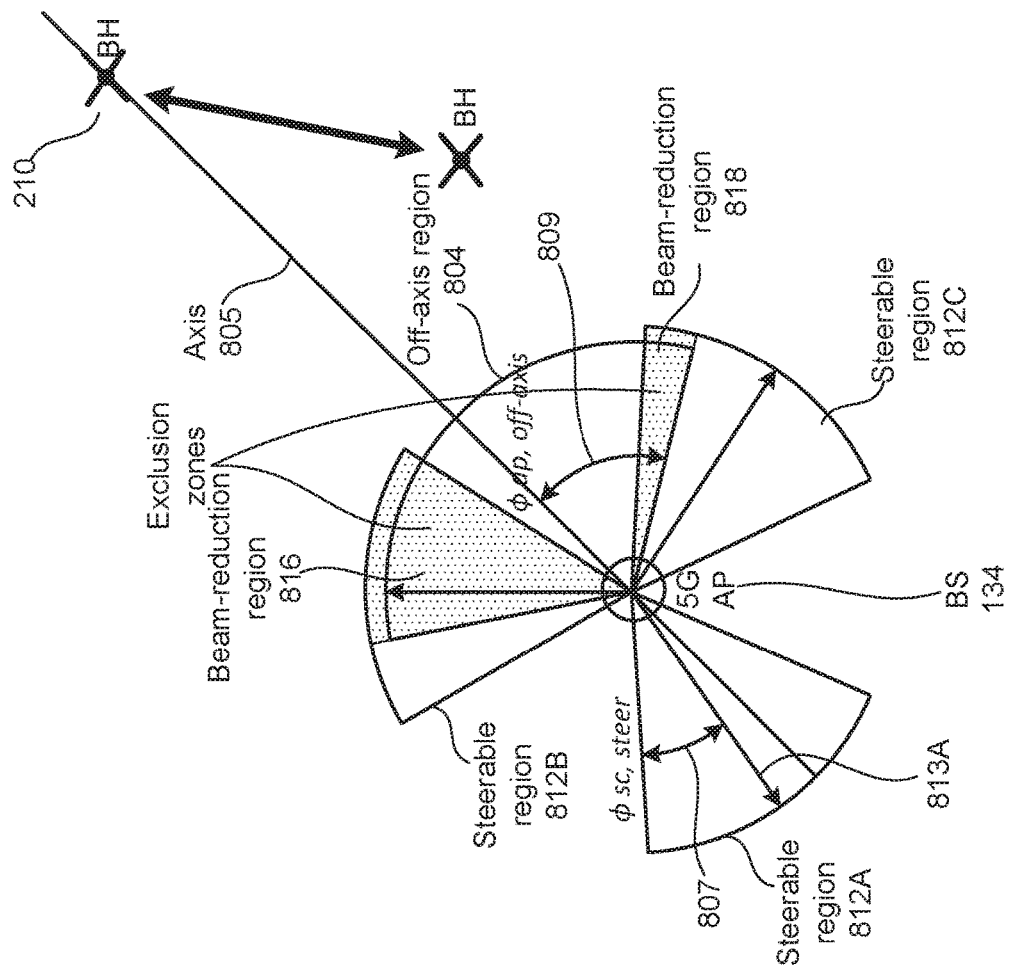
FIG. 8 is a diagram illustrating an example of beam-reduction zones according to an example implementation.

FIG. 8 is a diagram illustrating an example of beam-reduction zones according to an example implementation. A BS 134 is shown, including 3 sectors. An axis 805 is indicated between a backhaul node 210 (where the system is attempting to decrease interference) and the BS 134. An off-axis region 804 is shown, and may include a region 804 between the BS 134 and the backhaul node 210 in which a transmit beam from the BS 134, within this off-axis region 804, which would create interference at the backhaul node 210. An orientation is shown for each sector (arrow), such as arrow 813A indicating an orientation of a sector. A steerable region is shown for each of the three sectors, including a steerable (or steering) regions 812A, 812B, and 812C. A steerable region may indicate a region within a sector that a plurality of BS beams within the sector cover or extend. According to an example implementation, one or more beam-reduction regions (or exclusion zones) may be provided or defined as an overlap between the off-axis region 804 (a region that would create interference with backhaul node 210 if a transmit beam is present) and one or more steerable regions (a region in which one or more BS transmit beams are present or transmit). For example, a beam-reduction region 816 is provided as the overlap between off-axis region 804 and steerable region 812B, while a beam-reduction region 818 is provided as the overlap between off-axis region 804 and steerable region 812C. The beam-reduction regions 816 and 818 shown in FIG. 8 are merely illustrative examples, and other beam-reduction regions may be determined, and other techniques may be used to determine such regions.

Further details will now be described according to various example implementations.

1. Probe-Based Technique of Measuring Interference at the Backhaul Node

For managing the interference at the backhaul nodes, the 5G system should determine the location and/or amount of interference (e.g., RSRP of received signals from BS) at nearby backhaul receivers. A probe-based method may be used in obtaining the location and/or the required interference measurements (e.g., RSRP of received interfering beams from the BSs).

Alternative 1: A 5G probe that is co-located or at least in proximity with a backhaul node communicates its position to a 5G system. An example of such a 5G probe could be a 5G user device that is located close enough to the backhaul node.

Alternative 2: A 5G probe provides the following information that is detected at the backhaul node location. IDs of detected BSs. IDs (identifications) of dominant beams (having a beam signal measurement greater than a threshold) per detected BS that causes interference. Per-beam interference levels observed at the 5G probe. Measured RSRP, SINR, RSRQ, or other signal measurement may be used to detect interference level.

The connection between the 5G probe and the 5G access system can either be: Over-the air (wireless connection), or via a wired connection. Based on the information that is provided by the 5G probe, transmission power of the interfering beams is reduced or the beams are shutdown.

2. Determination of Beam-Reduction Regions (e.g., Based on Calculation Based Technique)

With reference to FIG. 8 (as an illustrative example), a 5G BS may, for example, define a beam reduction region(s) by using two angles, $\varphi_{ap,off\text{-}axis}$ (off-axis angle) and $\varphi_{sc,steer}$ (steering angle).

The off-axis angle 809 $\varphi_{ap,off\text{-}axis}$ measures or may indicate a 5G BS's location relative to the Backhaul node 210, while steering angle 807 $\varphi_{sc,steer}$ measures the angle that sector antenna (or beams of a sector) may steer.

Beam-reduction zone may be defined as an intersection between the following two fan-shaped regions:

1) Off-axis region 804 formed by $\varphi_{ap,off\text{-}axis} < \Phi_{ap,off\text{-}axis}$. An off-axis angle of a 5G AP, $\varphi_{ap,off\text{-}axis}$, is defined as an angle between the axis 805 connecting the interfering BS 134 and the Backhaul node 210. A maximum off-axis angle 809, which may be based on a receive beam width of the backhaul node 210. And, 2) Steering (or steerable) region (812A, 812B, 812C) formed by $\varphi_{sc,steer} < \Phi_{sc,steer}$. A steering angle of a sector, $\varphi_{sc,steer}$, is defined as an angle between the sector's mechanical orientation angle (or angle of the sector antenna), $\varphi_{sc,orient}$, and its maximum steerable range of the antenna for the sector.

The thresholds that are used to define an exclusion zone are denoted by capitals. The thresholds $\Phi_{ap,off\text{-}axis}$ and $\Phi_{sc,steer}$ correspond to $\varphi_{ap,off\text{-}axis}$ and $\varphi_{sc,steer}$, respectively.

3. Decrease Transmission Power or Turn-Off the Beams in the Beam-Reduction Zones and Possibly Handover of the UEs in the Exclusion Zones A 5G BS may reduce its transmission power or may turn-off interfering transmission beams in the beam-reduction region. The reduction in transmission power or turning-off (power down completely) transmission beams may be applied in the beam scanning periods used by the user devices to discover the best BS for attachment and set of suitable beams from that BS. Thus, as part of the normal operation of the BS/beam selection process, user devices will avoid attaching to the powered down or shut-down beams (transmission beams that have been reduced in transmission power) that would otherwise cause significant interference at the backhaul node (if they were not decreased in transmission power or turned off).

Thus, various example implementations may include:

A BS performing the steps of:

Identifying a set of beams from a plurality of beams generating too much interference to a backhaul node (e.g., having a RSRP, such as detected by a probe, greater than a threshold, or determined to be within the beam-reduction zone based on relative locations of BS and backhaul node, orientations of antennas of BS and backhaul node, and other criteria that can be determined by the BS, as described in the various example implementations described herein).

Mitigating interference on the set of beams by the BS

In addition, the step of identifying the set of beams may be based on the location of the BS relative to the location of the backhaul node receiver, orientation of the BS's plurality of beams and the orientation the antenna of the BS and orientation of the antenna of the backhaul node. Other factors or different factors may be used.

In addition, the step of identifying the set of beams may be based on the feedback received for a 5G probe device that is in proximity or co-located with the backhaul node.

In addition, the step of mitigating interference may be performed by reducing the transmission power on the set of identified beams, or may be performed by turning off or ceasing transmission, or transmitting at zero power, for each of the interfering BS transmit beams. For example, turning off a beam may include removing the beam from the scanning sequence of the transmit beans, while transmitting a beam at zero power may include leaving the beam in the scanning pattern, but reducing the transmit power for such beam to zero power.

In another example implementation, a probe device (e.g., probe user device) may be provided in proximity or co-located with the backhaul node. The backhaul node may detect received power or interference for a set of BS transmit beams, and may determine which of the BS beams generate interference beyond a predetermined threshold (e.g., which beams have a RSRP at the probe that is greater than a threshold), and then providing a feedback message to a network (e.g., BS, network controller, IM controller, core network, or other device) identifying the BS and its associated set of beams that require interference mitigation.

Figure 9:
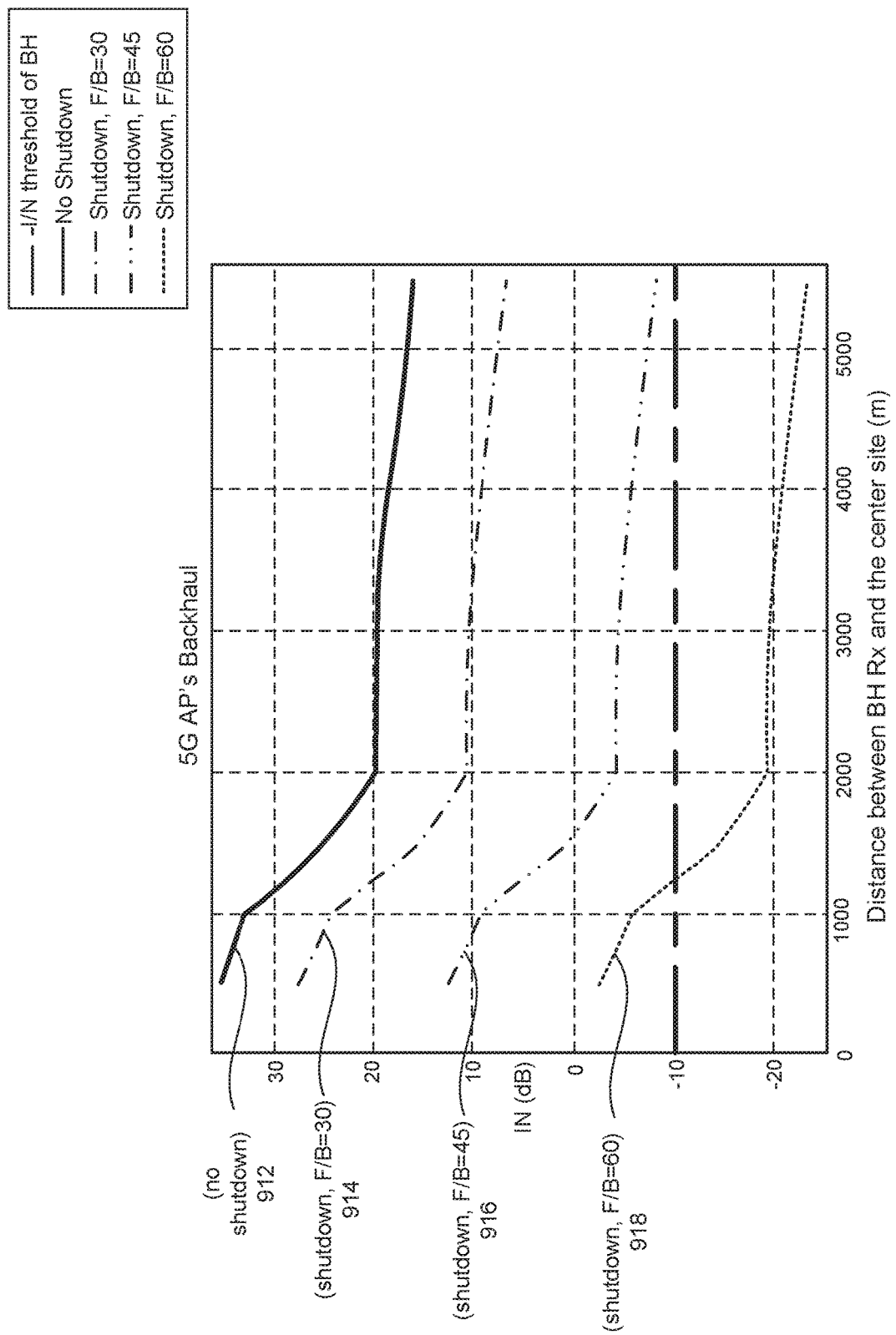
FIG. 9 is a diagram illustrating the impact of shutdown of interfering beams on BS (AP)-to-backhaul interference.

FIG. 9 is a diagram illustrating the impact of shutdown of interfering beams on BS (AP)-to-backhaul interference. The dashed line shows the I/N interference threshold (where below this threshold is acceptable or a BS beam). In the case of shutting down or turning of a set of beams, the line 912 indicates performance for no shutdown, and shows the highest interference or signal power. Next lines 915, 916 and 918 show improved performance, as F/B increases, and as distance between the BS and the backhaul node increases. It is also shown in FIG. 9 that shutting down or turning off a set of interfering beams will operate to reduce interference at a backhaul node.

These FIGS. indicate that defining beam-reduction region and shutting down beams that fall within those regions does suppress BS-to-Backhaul interference. FIG. 9 also demonstrates the impact of the BS antenna front-to-back (F/B) ratio on the backhaul interference levels. With beam shutdown and an BS F/B ratio of 60 dB, 5G interference falls below the required I/N threshold of −10 dB at all BS-to-BH distances greater than about 1000 m, according to an illustrative example.

Figure 10:
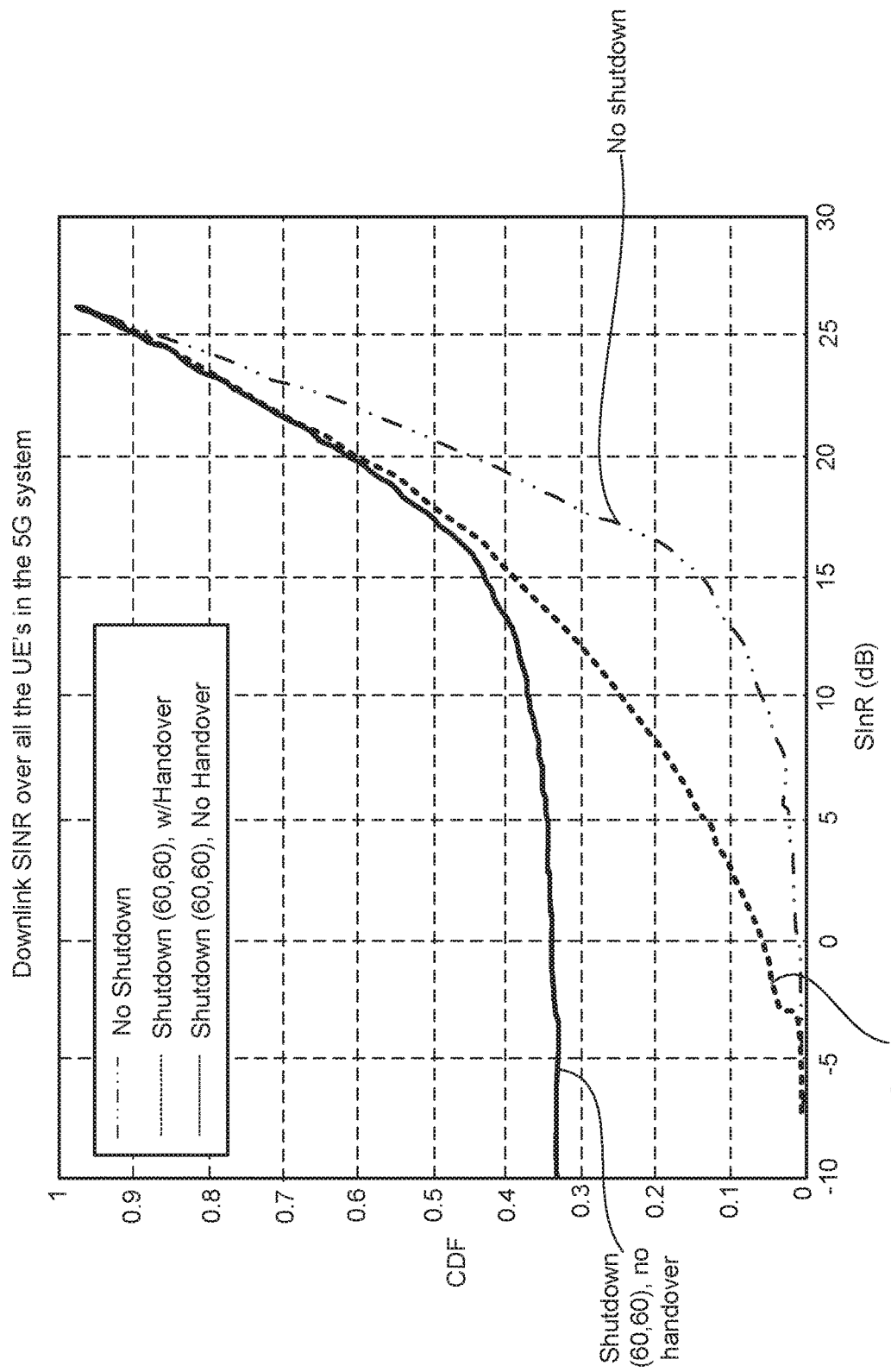
FIG. 10 is a diagram illustrating an impact of shutdown of interfering beams on performance of the 5G access system.

FIG. 10 is a diagram illustrating an impact of shutdown of interfering beams on performance of the 5G access system. FIG. 10 illustrates that performing beam or sector handover for the user devices attached to the interfering beams keeps the 5G access system operational even after shutting down beams in the beam-reduction regions. Without handover, shutting down beams creates significant outage in the 5G access system (shutdown, (60/60), no handover curve). With handover, the outage in the system is no longer observed (shutdown (60/60) with handover curve). Beam shutdown may degrade the overall system performance to an extent, while significantly reducing interference levels observed at the backhaul nodes.

Figure 11:
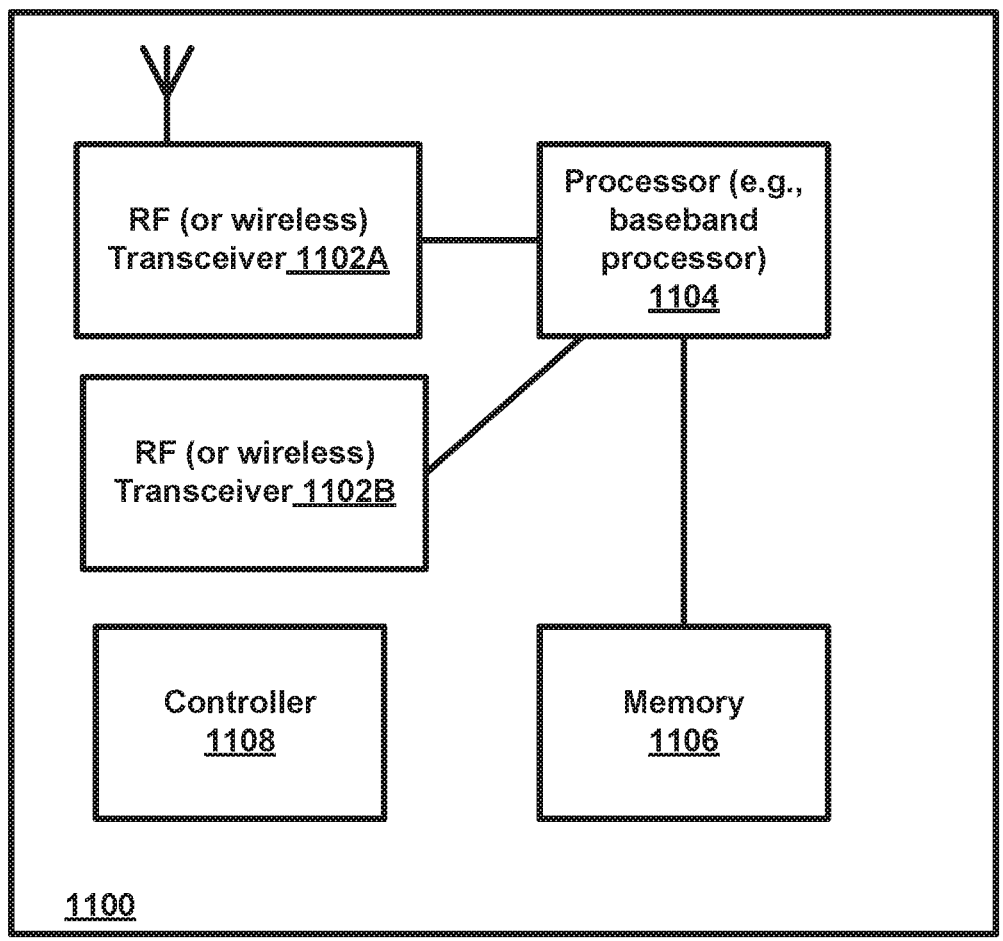
FIG. 11 is a block diagram of a node or wireless station (e.g., network device, base station/access point, wireless node, or mobile station/user device/UE) according to an example implementation.

FIG. 11 is a block diagram of a wireless station (e.g., AP or user device) 1100 according to an example implementation. The wireless station 1100 may include, for example, one or two RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of reducing interference from a base station of a wireless access system at a wireless node of another wireless system, the method comprising:
    determining a location of the base station relative to the wireless node;
    determining a receive beam of the wireless node;
    determining, based at least on the location of the base station relative to the wireless node and the receive beam of the wireless node, a beam-reduction region that includes one or more interfering transmit beams of the base station within the beam-reduction region;
    causing the base station to decrease a power of downlink pilot transmissions corresponding to the one or more interfering transmit beams within the beam-reduction region; and
    causing a user device associated with the wireless node to select a transmit beam of the base station based on the beam-reduction region.

2. The method of claim 1 and further comprising:
    determining an orientation of an antenna for a base station; and
    determining an orientation of an antenna of the wireless node; and
    wherein the determining a beam-reduction region comprises:
        determining, based on the location of the base station relative to the wireless node and the orientations of the base station antenna and the wireless node antenna, a beam-reduction region that includes one or more interfering transmit beams of the base station within the beam-reduction region.

3. The method of claim 2 wherein the causing the base station to decrease a transmit power for the one or more interfering transmit beams comprises:
    causing the base station to decrease a transmit power for each of one or more transmit beams for each of a plurality of BSs, wherein an amount of decrease in transmit power for each transmit beam is based on the location of the base station relative to the wireless node and the orientations of the base station antenna and the wireless node antenna.

4. The method of claim 2 wherein the determining an orientation of an antenna for the base station comprises:
    determining an orientation of an antenna for a base station, including an azimuth angle and an elevation angle of the antenna for the base station.

5. The method of claim 2 wherein the determining an orientation of an antenna for the wireless node comprises:
    determining an orientation of an antenna of a wireless node, including an elevation angle and an azimuth angle of the antenna of the wireless node.

6. The method of claim 1 wherein the wireless node comprises a backhaul node, and wherein causing the base station to decrease a transmit power for the one or more interfering transmit beams reduces, at the backhaul node, interference between a signal transmitted by the base station and another signal received by the backhaul node.

7. The method of claim 1 wherein the causing the base station to decrease a transmit power for the one or more interfering transmit beams comprises:
    causing the base station to turn off the one or more interfering transmit beams, including either ceasing to transmit a signal via the one or more interfering beams, or transmitting a signal at zero power via the one or more transmit beams.

8. The method of claim 1 wherein the determining a beam-reduction region comprises determining a beam-reduction region as an overlap of the following two regions:
    a first region in which a transmit beam transmitted by the base station within this first region would create interference at the wireless node; and
    a steerable region for base station transmit beams within one or more sectors of the base station.

9. The method of claim 1 wherein the determining a beam-reduction region comprises:
    determining a beam-reduction region as an overlap of the following two regions:
        an off-axis region within a range of an axis between the base station and the wireless node in which a transmit beam transmitted by the base station within this off-axis region would create interference at the wireless node; and
        a steering region of a sector of the base station that defines a steerable region of a plurality of transmit beams of a sector of the base station.

10. The method of claim 1 wherein the determining a beam-reduction region comprises:
    determining a beam-reduction region as an overlap of the following two regions:
        an off-axis region between a) a line identifying an axis between the base station and the wireless node and b) a maximum off-axis angle based on a receive beam width of the wireless node; and a steering region of a sector of the base station, including a region between the antenna orientation for a sector of the base station and a maximum steerable range of the antenna for the sector.

11. The method of claim 1 and further comprising:
receiving, from a probe user device located in close proximity or co-located with the wireless node, signal measurements for one or more of the interfering beams within the beam-reduction zone; and
wherein the causing comprises causing, based on the signal measurements for one or more of the interfering beams, the base station to decrease a transmit power for the one or more interfering transmit beams within the beam-reduction zone.

12. The method of claim 1 wherein the determining a location of a base station relative to a wireless node comprises at least one of the following:
determining, based on a table lookup, a location of the base station relative to the wireless node;
receiving, from a probe user device located in close proximity or co-located with the wireless node, information indicating a location of a base station relative to a wireless node; and
receiving, from a probe user device located in close proximity or co-located with the wireless node, signal measurements for one or more of the interfering beams within the beam-reduction zone.

13. The method of claim 1 wherein the wireless node is a backhaul node of a backhaul system that provides wireless backhaul communications between the wireless access system and a core network; and
wherein the causing comprises:
causing the base station to decrease a transmit power for the one or more interfering transmit beams within the beam-reduction region that overlaps with the receive beam of the backhaul node so as to reduce interference from the base station to the backhaul node.

14. The method of claim 1 further comprising:
reducing a power of downlink (DL) pilot transmissions corresponding to the one or more interfering transmit beams within the beam-reduction region; and
causing a user device associated with the wireless node to select a transmit beam of the base station having a power that is not reduced.

15. A computer program product, the computer program product comprising a non-transitory computer-readable storage medium and storing executable code that, when executed by at least one data processing apparatus, is configured to cause the at least one data processing apparatus to perform the method of claim 1.

16. An apparatus comprising at least one processor and at least one memory including computer instructions, when executed by the at least one processor, cause the apparatus to: determine a location of a base station of a wireless access system relative to a wireless node of a wireless backhaul system; determine a receive beam of the wireless node; determine, based at least on the location of the base station relative to the wireless node and the receive beam of the wireless node, a beam-reduction region that includes one or more interfering transmit beams of the base station within the beam-reduction region; and cause the base station to decrease a power of downlink pilot transmissions corresponding to the one or more interfering transmit beams within the beam-reduction region; and
causing a user device associated with the wireless node to select a transmit beam of the base station based on the beam-reduction region.

* * * * *